United States Patent
Giard-Blanchard et al.

(10) Patent No.: US 7,160,843 B2
(45) Date of Patent: *Jan. 9, 2007

(54) OIL-BASED DEMULSIFYING AGENT AND ITS USE IN THE TREATMENT OF DRAINS BORED IN OIL-BASED MUD

(75) Inventors: Claire Giard-Blanchard, Paris (FR); Annie Audibert-Hayet, Croissy sur Seine (FR); Christine Dalmazzone, Versailles (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 410 days.

This patent is subject to a terminal disclaimer.

(21) Appl. No.: 09/953,209

(22) Filed: Sep. 17, 2001

(65) Prior Publication Data
US 2002/0055438 A1  May 9, 2002

(30) Foreign Application Priority Data
Sep. 15, 2000  (FR) .................................. 00 11842

(51) Int. Cl.
*C09K 8/52* (2006.01)
(52) U.S. Cl. ............... 507/252; 507/256; 507/259; 507/261; 507/239; 507/240; 507/244; 507/921; 516/198; 516/200; 166/312
(58) Field of Classification Search ............... 507/252, 507/256, 259, 261, 921, 129, 131, 135, 136, 507/138, 239, 240, 244; 166/312; 516/198, 516/200
See application file for complete search history.

(56) References Cited
U.S. PATENT DOCUMENTS

| 4,316,806 | A | * | 2/1982 | Canevari ............... 210/708 |
| 4,316,808 | A | * | 2/1982 | Blair, Jr. ............... 507/261 |
| 4,479,016 | A | * | 10/1984 | Klahr et al. ............ 568/606 |
| 5,256,305 | A | | 10/1993 | Hart |
| 5,622,921 | A | * | 4/1997 | Dyer ..................... 507/259 |
| 5,728,658 | A | * | 3/1998 | Duncan ................. 508/485 |
| 5,744,046 | A | * | 4/1998 | Dalmazzone et al. ... 210/749 |
| 6,435,277 | B1 | * | 8/2002 | Qu et al. ................ 507/240 |
| 6,479,432 | B1 | | 11/2002 | Sixl |

FOREIGN PATENT DOCUMENTS

| GB | 1524448 A | 9/1978 |
| WO | 0006677 A | 2/2000 |

* cited by examiner

Primary Examiner—Philip C. Tucker
(74) Attorney, Agent, or Firm—Millen, White, Zelano & Branigan, P.C.

(57) ABSTRACT

An oil-based demulsifying formulation which can be used in the treatment of drains bored in oil-based mud, non ecotoxic and optimally compatible with formation fluids, comprises at least one wetting agent chosen from anionic surfacetants and at least one demulsifier (or "emulsion breaker") chosen from copolymers of ethylene oxide and propylene oxide, alcohol or phenol derivatives with alkoxylated or polyalkoxylated chain formations, polyalkyleneglycols, polyamines, alkoxylated or polyalkoxylated derivatives of amines, quaternary ammonium salts, quaternized alkanolamine esters, alkyl esters of fatty acids or natural oils, possible alkoxylated or polyalkoxylated, and silicated derivatives such as polysiloxanes.

37 Claims, 4 Drawing Sheets

OIL-BASED DEMULSIFYING AGENT AND ITS USE IN THE TREATMENT OF DRAINS BORED IN OIL-BASED MUD

FIELD OF THE INVENTION

The invention relates to the treatment of drains bored in oil-based mud.

It relates more particularly to an oil-based demulsifying formulation which can be used in the treatment of drains bored in oil-based mud, preferably non ecotoxic and optimally compatible with formation fluids, comprising a surfactant system used in an oil base in order to limit as much as possible emulsion formation phenomena in situ and resaturation in the aqueous phase around the well.

BACKGROUND OF THE INVENTION

An oil formation is damaged when a well is less productive than predicted by an analysis of the well test results. The formation damaging mechanisms depend on the type of reactions produced between the well fluids, the rock formation fluids under working conditions (pressure and temperature of the layer and the mud). Deterioration of the productive formation close to the well is due to harmful interaction between the formation fluids and foreign fluids introduced. If the well's fluids are revealed to be responsible for the damage, chemical treatment is then necessary to restore the reservoir's characteristics. This must allow the external and/or internal cake to be destroyed and the damaged area near the well to be cleaned. This treatment may or may not be combined with matrix treatment of acid type.

In general, oil-based well fluids generate little filtrate, have good rheological properties and form a thin, permeable cake. However, they contain chemical additives (surfactants) intended to emulsify the water in the form of droplets inside the continuous oil-based phase and to render oil-wettable the solid particles used as a weightening or viscosification agent. These surfactants in excess concentration in the fluid to maintain the inverse emulsion's stability can penetrate the formation with the filtrate.

Three types of damage can in particular be envisaged in the case of oil-based fluids:

the formation of an emulsion within the reservoir, resulting from interactions between the oil-based mud's filtrate (which mainly contains oil and surfactants) and the reservoir fluids (brine and oil). The excess emulsifiers introduced into the formulation can enter into contact with the formation. Now, significant shearing on constriction of the pores in the presence of emulsifier can lead to the formation of a very stable and viscous emulsion resulting in a reduction in the effective mobility of the hydrocarbons present;

deterioration of the initial wettability of the reservoir rock. Emulsifying products generally transform rock which is initially water-wettable into an intermediate state of wettability, or even oil-wettable, which can result in a modification in the relative permeability to oil and therefore reduce the oil's mobility; and the deposit of fine mobile particles in the pores (reduction in absolute permeability).

The chemical composition of the filtration cake must be carefully considered when treatment fluids are designed. The cake is mainly constituted by droplets of emulsified water, which act as colloidal particles and combine with the solid particles in suspension in the fluid to form a cake. The stability of the emulsion, the type and nature of the solids influence both the fluid losses and the cake's filtration properties. The choice of the treatment product must take into account the parameters required to wash the cake and clean out the formation.

The treatment envisaged relates to:
dissolving the weightening agents present in the cake and attacking the additives contained in the filtrate.

The treatment must therefore be adapted to the type of mud used. The main parameters that should be considered are:

the type and extent of the damage;
the reservoir's characteristics (porosity and permeability);
the type of formation (type of rock and solubility in acid);
possible contaminants (water, muds—water-based mud and oil-based mud—cements, bacteria);
compatibility of treatment fluid with contaminants;
bottomhole pressure and temperature;
treatment time; and
physical limits of well equipment.

DESCRIPTION OF THE PRIOR ART

The improvement of the design of a drilling fluid intended to reduce damage can be completely ruined by the use of unsuitable cleaning procedures and/or products. Solutions for treating oil-based cakes currently available are in aqueous form and generate considerable additional damage, or even plugging the well. Numerous examples of drain treatment using surfactants used in the aqueous phase can be found in the literature (Patents U.S. Pat. Nos. 4,681,165, 4,595,511, 4,681,164 and 5,110,487). The use of oil-based surfactants to break emulsions has been reported (Patents U.S. Pat. Nos. 5,614,101, 5,256,305 and 4,416,754), but the purpose is not use for oil production.

SUMMARY OF THE INVENTION

A subject of the present invention is a demulsifying formulation used in an oil base (preferably in a non-polluting organic base, which can be the oil of the mud itself), said demulsifying formulation being capable of breaking a water-in-oil emulsion. A subject of the invention is also the use of such a formulation in the treatment of drains drilled in oil-based mud. The simplification of the treatment solution limits the resaturation effects in the aqueous phase around the well and the formation of emulsions in situ.

DETAILED DESCRIPTION OF THE INVENTION

The invention provides oil-based demulsifying formulations characterized in that they comprise at least one wetting agent, at least one demulsifier (or "emulsion breaker") and at least one solvent, the whole being a mixture in an organic base.

More particularly in the formulations according to the invention, said wetting agent is present in a proportion of 15 to 50% by weight of pure surfactant; and said demulsifying agent in a proportion of 0.5 to 20% by weight of pure surfactant; and said solvent in a proportion of 40 to 85% by weight; the whole having a concentration of pure surfactants of 0.005 to 20 g, preferably 0.01 to 10 g, for 100 ml of said organic base.

The wetting agent can be chosen more particularly from anionic surfactants such as sodium dialkyl sulfosuccinates, for example sodium dioctyl sulfosuccinate.

The demulsifying agent (or "emulsion breaker") is a non-ionic or cationic surfactant, which can more particularly be chosen from copolymers of ethylene oxide and propylene oxide, alcohol or phenol derivatives with alkoxylated or polyalkoxylated chain formations, polyalkyleneglycols, polyamines, alkoxylated or polyalkoxylated derivatives of amines, quaternary ammonium salts, quaternized alkanolamine esters, alkyl esters of fatty acids or natural oils, possibly alkoxylated or polyalkoxylated, and silicated derivatives such as polysiloxanes.

The solvent can be any organic base, chosen more particularly from petroleum fractions such as kerosenes, alcohols and hydro-alcoholic mixtures and certain oils.

The base in which the composition defined above is used is generally a mineral oil or an oil of vegetable origin, preferably non-polluting. As examples of oils of vegetable origin, there can be mentioned the mixtures of alkyl esters of vegetable oils, such as the mixtures of methyl esters of rapeseed oil.

When the organic base is an oil, it may be the same oil as that in the mud. In this case, a mineral oil can for example be used, such as HDF 2000® oil or EDC 95® oil (marketed by the company Total Solvant), or also a vegetable oil, such as BDMF® oil (a mixture of methyl esters of rapeseed oil marketed by the company TotalFina Oléochimie).

In a variant, the organic base as defined above can itself be used as a solvent for the surfactants (wetting and/or demulsifying agent) for the formulations considered in the invention.

The treatment formulations according to the invention are chosen with respect to the mud formulation in order to be compatible with the emulsifying systems and wetting agents generally used to disperse the solids in the mud. The demulsifying formulations according to the invention correspond to selection criteria which can be verified by implementing the following determinations:
- study of the physicochemical properties of the treatment product (i.e. the demulsifying formulation diluted in the organic base);
- characterization of the cake destructuring action: in a crystallizer, in a static filtering cell, in a dynamic filtering cell and on a sandstone drilling core using the Differential Scanning Calorimetry (DSC) technique and cryomicroscopy;
- compatibility of the formation fluids (oil and brine), treatment fluids (demulsifying formulation in an oil base) and drilling fluids (filtrate of the oil-based drilling mud): study of the formation of emulsions in situ.

The suitability of the demulsifying formulation for use according to the invention is mainly verified by the DSC technique. This technique is described in detail in Dalmazzone, C., Clausse, D. Microcalorimetry, 1999. The technique is implemented on cake samples before and after treatment to evaluate the breaking of the emulsion within the cake.

The thermal DSC technique is generally used to determine the composition of the water-in-oil emulsions as it allows separate identification of the free water and the emulsified water (the free water crystallizes at much higher temperatures than the droplets of water in emulsion). This technique is based on the solidification and fusion properties of the droplets and of the medium in which they are dispersed. The information obtained relates to:
- the type of emulsion: single (water-in-oil or oil-in-water) or multiple (water-in-oil-in-water or oil-in-water-in-oil);
- the quantity of liquid and its state: bound or dispersed or free;
- the compositions of the free and dispersed phases;
- the average diameter of the droplets and their evolution over time due to coalescence or Ostwald's maturation;
- transfers of matter between droplets due to their different compositions.

The conditions to be fulfilled for the demulsifying system are:
- compatibility of the oil-based mud filtrate, the reservoir fluids and the treatment fluid. The proportion of each phase varies in order to determine the formation of emulsions in the form of a ternary diagram. The formation of emulsion is initially characterized by "Bottle Test" type tests, then in a more quantitative fashion by monitoring over time using Turbiscan® (an infrared backscattering spectrometer marketed by Formul'Action). Different parameters can be studied: the influence of temperature, the energy of the mixture).
- destructuring of the cakes obtained in API tests by emulsion breaking. The destructuring of the cakes is evaluated by analysis of the DSC graphs and by cryomicroscopy.

EXAMPLES

The following examples illustrate the invention without limiting its scope.

In these examples, the following formulations were tested:

Formulation 1:
wetting agent: 25% by weight of OTS® aerosol (70% by weight of sodium dioctyl sulfosuccinate in a petroleum fraction) and 20% by weight of Celanol DOS® (65% by weight of sodium dioctyl sulfosuccinate in a hydro-alcoholic mixture);

demulsifier: 5% by weight of Pluriol® (polyethylene glycol 100);

diluent: 50% by weight of P220S® (Ketrul 210: kerosene).

This formulation therefore contains 30.5% by weight of pure wetting agent, 5% by weight of pure demulsifier and, in total, 64.5% by weight of solvents.

Formulation 2:
wetting agent: 20% by weight of OTS® aerosol (70% by weight of sodium dioctyl sulfosuccinate in a petroleum fraction) and 20% by weight of Celanol DOS® (65% by weight of sodium dioctyl sulfosuccinate in a hydro-alcoholic mixture);

demulsifier: 25% by weight of TP 360® (20% by weight of copolymer of polyalkyleneoxydimethylsiloxane in 2-ethyl-1-hexanol);

diluent: 35% by weight of P220S® (Ketrul 210: kerosene).

This formulation therefore contains 27% by weight of pure wetting agent, 5% by weight of pure demulsifier and, in total, 68% by weight of solvents.

Example 1

Cake Destructuring Test in a Crystallizer

The kinetic aspects of the cake's destructuring and the influence of temperature were studied in three commercial oil-based mud formulations.

Principle: The oil-based mud is filtered on filter paper in a static filtering cell using the API procedure at a temperature of 80° C. and under a pressure difference of 35 bars for one hour. Segments of the cake obtained are placed in crystallizers in contact with 20 ml of treatment solution at 1 g/100 ml in the oil of the mud for varying times at ambient temperature and at 80° C. The breaking of the emulsion within the cake is evaluated using the DSC technique.

Pieces of the filter paper supporting the cake are cut away with a scalpel. The weight of the samples is approximately 10 mg, weighed accurately. Using tongs, the sample is placed in an aluminum capsule. Particular care is taken in handling the sample (cutting away with the filter paper, placing in the capsule) to avoid damaging the cake mechanically.

The cell is then introduced into the kiln of the DSC device beside an empty reference cell. The cell then undergoes a cooling—heating cycle from 20° C. to −120° C. The heat flow Q (in W/g) is recorded according to the temperature T (in ° C.). Calibration is first carried out with a cell containing brine with the same concentration of $CaCl_2$ as the mud. The presence of water in the sample is detected by brine crystallization peaks.

Qualitatively, the temperature corresponding to the peaks can be used to evaluate the state of the water in the sample, the free water crystallizing at temperatures that are higher than the emulsified water. Moreover, the shape of the peak allows the determination of the polydisperse (peak which is irregular or has a shoulder) or monodisperse (regular and tapered peak) nature of the emulsion within the cake, which provides information on its stability.

From a quantitative point of view, the position of the peaks allows the evaluation of the fineness of the emulsion (the lower the crystallization temperature, the smaller the diameter of the droplets). Moreover, the size of the peaks provides the weight of the water contained in the sample.

TABLE 1

| | Mud systems used | | |
|---|---|---|---|
| | Formulation A* | Formulation B | Formulation C |
| Base oil | HDF 2000 ® mineral oil | BDMF ® rapeseed ester | EDC 95 ® mineral oil |
| Brine | Water with 24% by weight of $CaCl_2$ | Water with 20% by weight of NaCl | Water with 24% by weight of $CaCl_2$ |

*Formulation A is the BAROID 80-20 ® formulation

Figure 1:
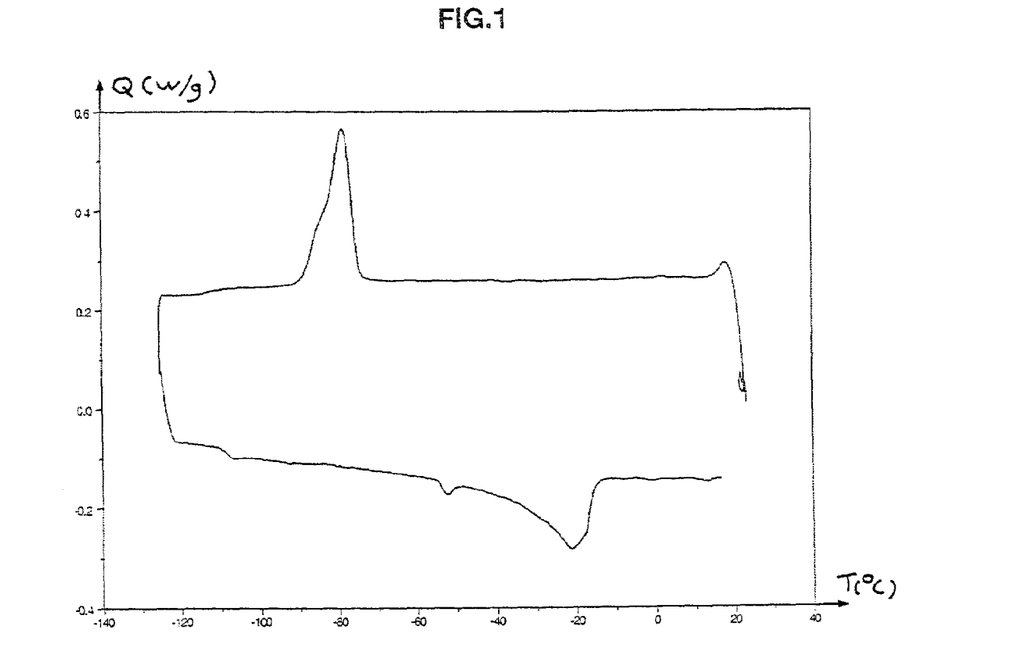
FIGS. 1, 2, 3, 4, 5 and 7 are DSC graphs of various cakes, as explained in Examples 1 and 2.

Results: From a qualitative point of view, at ambient temperature, even at short contact times, an evolution in the emulsion's quality is observed. The emulsified water peak (−80° C.) widens at the base and has a shoulder, which shows the polydispersity of the emulsion (cf. FIG. 1: DSC analysis of the BAROID cake treated in a crystallizer (for 24 hours) by demulsifying formulation 1 at 1 g/100 ml).

Figure 2:
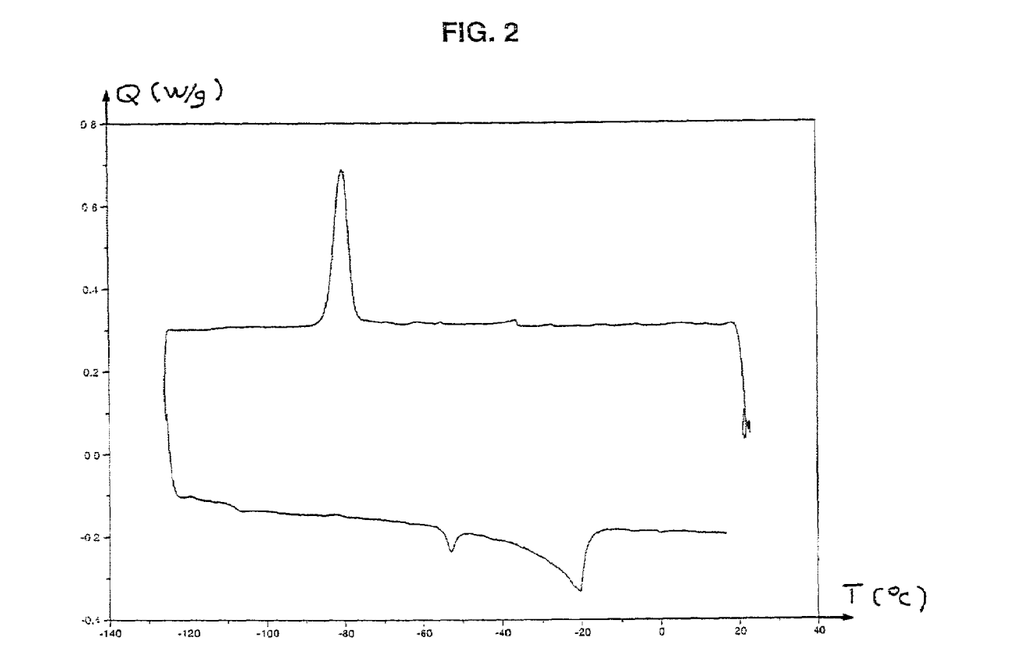

After longer contact times, the appearance of a free water peak is observed in the region of −40° C. (the free water crystallizes at higher temperatures than the emulsified water). The presence of free water inside the cake indicates the breaking of the emulsion, therefore the destructuring of the cake (cf. FIG. 2: DSC analysis of the BAROID cake treated in a crystallizer (for 168 hours) with demulsifying formulation 1 at 1 g/100 ml).

Figure 3:
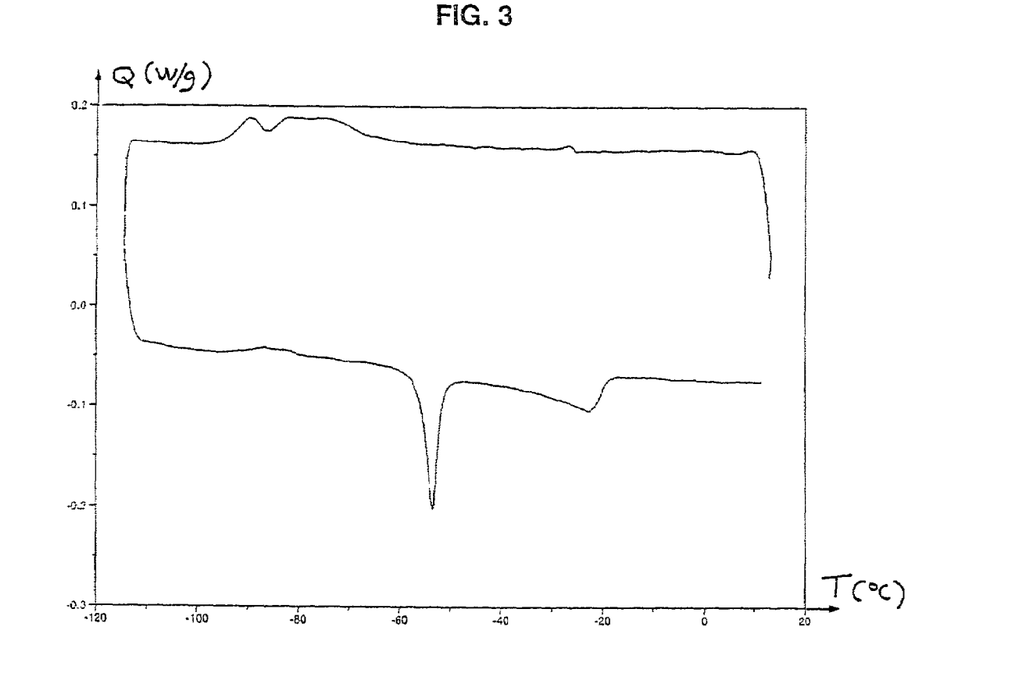
Figure 4:
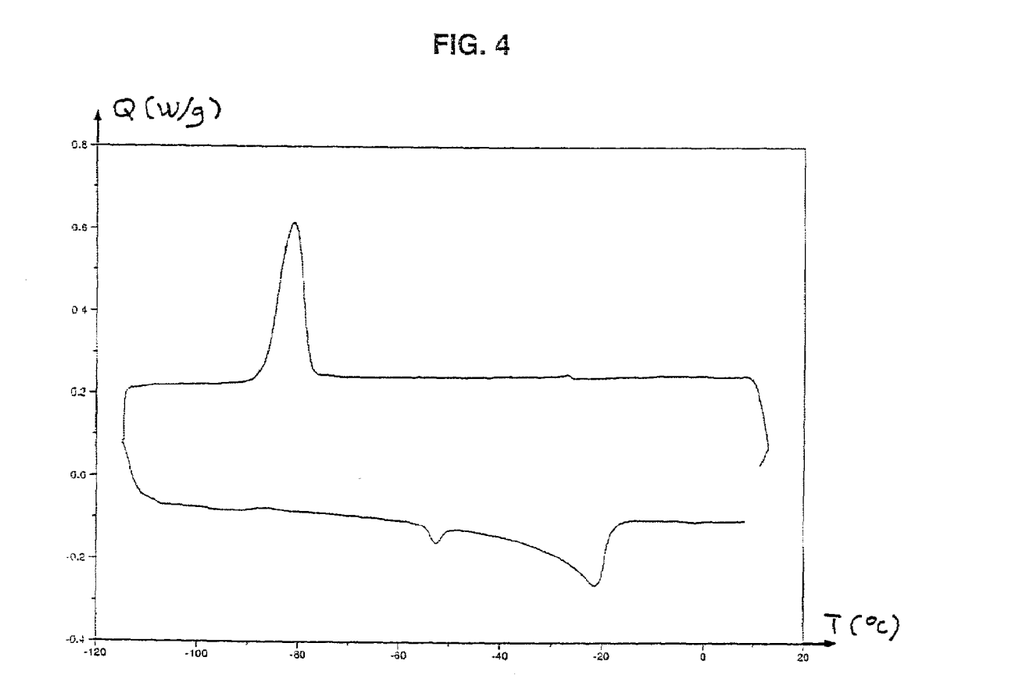

The effect of demulsifying formulation 1 on Formulations B and C of cakes was revealed at 80° C. for the same contact times: the increase in temperature appears to enhance the breaking of the emulsion. The polydispersity of the emulsion is observed starting at short contact times and the free water peak appears for shorter times (cf. FIGS. 3 and 4: DSC analysis of cakes B and C treated with demulsifying formulation 1 at 80° C. for 2 hours).

Figure 5:
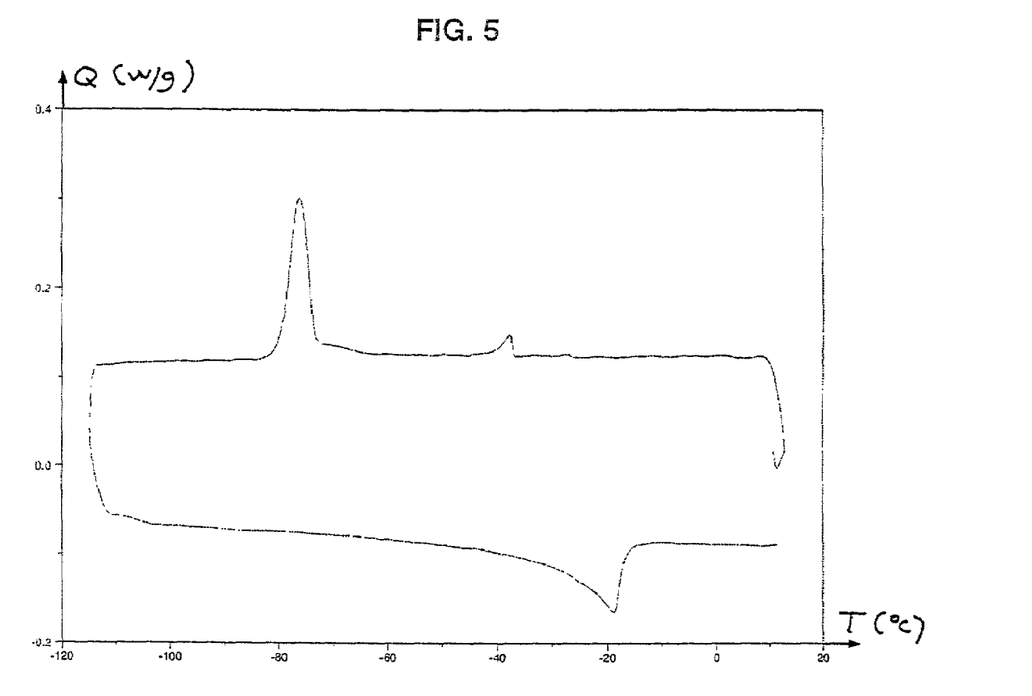

The same type of test was carried out on the BAROID cake with demulsifying formulation 2. DSC characterization of the emulsion breaking shows the appearance of a free water peak (−28° C.) after 48 hours of cake—demulsifier contact time (cf. FIG. 5: DSC analysis of the BAROID cake treated in a crystallizer (for 48 hours) with demulsifying formulation 2 at 1 g/100 ml).

Example 2

Static Filtration

Figure 6:
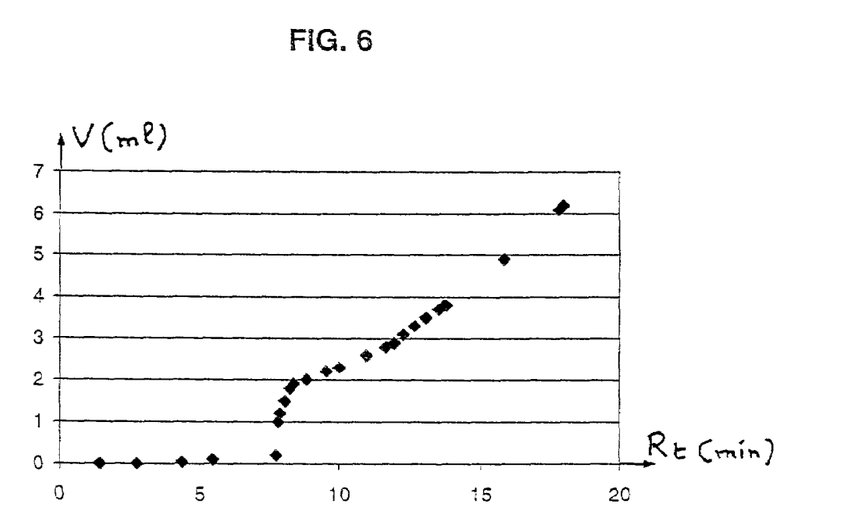
FIG. 6 is a static filtration graph as explained in Example 2.

Mud formulation A (BAROID) is filtered using the API procedure (API standard 13) at a temperature of 80° C. and under a pressure difference of 35 bars. After 300 ml of mud is filtered for one hour, the cell is depressurized, emptied of mud, rinsed with 200 ml of treatment solution, then filled with 300 ml of treatment solution at 1 g/100 ml of demulsifying formulation 1. The cake inside the cell is left in contact with the treatment solution for 30 minutes at atmospheric pressure and at 80° C. (soaking time), then additional pressure of 10 bars is applied in order to allow another filtration. A two-phase filtrate is observed after filtering for 10 minutes. The breaking of the emulsion is also correlated to the break in the line of the filtration graph, which also appears in the region of 10 minutes (cf. FIG. 6: HP-HT static filtration of mud A followed by demulsifying filtration 1 at 1 g/100 ml after a contact time of 30 minutes. In FIG. 6, the volume V in ml is shown in terms of the root of the time in minutes $R_t$).

Figure 7:
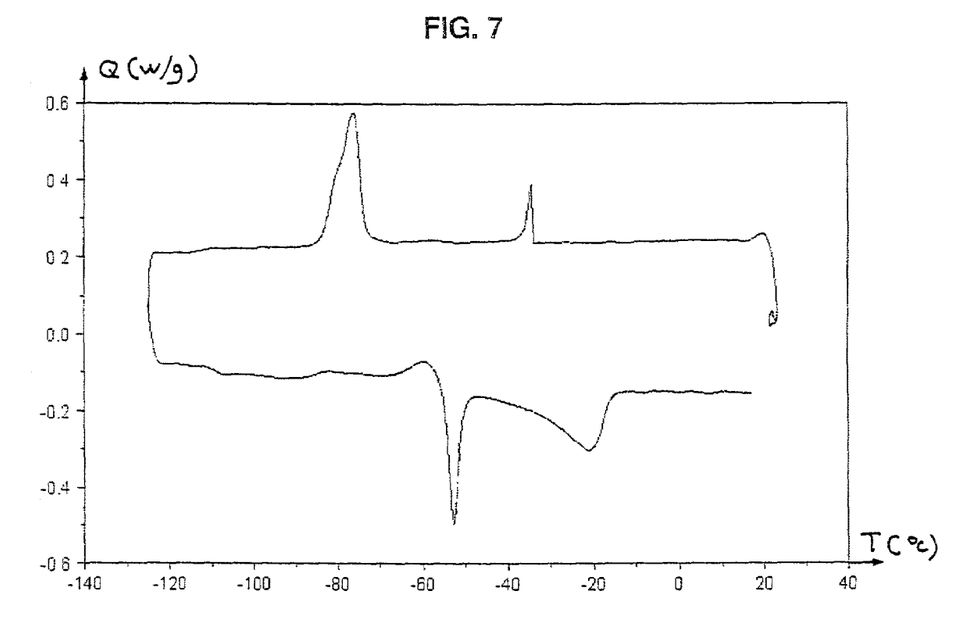

A sample of the cake treated is analyzed using the DSC technique as previously. The breaking of the emulsion within the cake is confirmed by the cooling—heating cycle obtained in DSC. A clear peak appears in the region of −40° C., corresponding to the free water originating from the breaking of the emulsion (cf. FIG. 7: DSC analysis of the BAROID cake treated in static filtration with demulsifying formulation 1 at 1 g/100 ml of oil). The emulsified water is given by the peak in the region of −80° C.

The same type of test was carried out with a treatment product containing 6% by weight of commercial product DM1® (supplied by the company BAROID) in solution in 64% by weight of the base oil HDF 2000® and 30% by weight of an aromatic solvent PARAGON®. The results represented by the drainage graph over time show a small filtration gradient and do not show a break in the line, even after filtering for twelve hours. The critical time cannot therefore be determined (Table 2).

TABLE 2

Treatment of the cake in static filtration with a commercial product in an oil phase

| Filtrate after 12 hours (cm³) | Gradient (cm³/min) | Critical time (min) |
|---|---|---|
| 4.1 | 0.007 | — |

Example 3

Compatibility

In order to avoid additional damage to the formation of the wall, it is advisable to check whether emulsions have formed in situ by choosing a treatment fluid that is compatible with the reservoir fluids (brine and oil) and the mud filtrate.

In this example, the brine (NaCl, 40 g/l) is placed in contact with an organic phase comprising the reservoir oil, the mud filtrate and the demulsifier.

The filtrate is reconstituted from the base oil and the mud surfactants. In the organic phase, the proportions of filtrate and reservoir oil vary: 0-100, 25-75, 50—50, 75-25, 100-0 (proportions by volume). Demulsifying formulation 1 is added at a rate of 1 g per 100 ml.

The brine is added progressively to the organic phase, the emulsion is agitated for 1 minute at 12,000 rpm with a commercial Hamilton Beach agitator. The proportion of brine in the system varies from 10 to 90% (10, 25, 50, 75 and 90%).

Phase separation is observed visually on a 250 ml graduated test tube, then with an infrared backscattering spectrometer (Turbiscan®).

For oil/filtrate ratios of less than 75/25, the least favorable mixture (90% brine, 10% oil) shows immediate separation of the organic phase, visible after a few minutes, which is confirmed by measurement with the Turbiscan®. The emulsions with 75, 50, 25 and 10% of brine also give immediate separation, visible after 30 minutes. After a few hours, the separated water is totally limpid.

The formation of emulsion is observed when the proportion of formation oil is greater than or equal to 75% of the organic phase and the percentage of emulsion organic phase is greater than 50%, i.e. in unlikely situations. In this case, creaming of the emulsion is observed without immediate breaking.

Example 4

Dynamic Filtration

The dynamic filtration test on a core is carried out using the dynamic press filter developed at the Institut Français du Pétrole (Li, Y. D., Rosenberg, E., Argillier, J. F.: "Static and Dynamic Filtration Properties of Aqueous Suspensions of Clays and Electrolytes" Revue de l'Institut Français du Pétrole, 52, 2, 207–218, 1996.).

The mud is introduced into the cell (V # 400 cm³), a cone-plane geometry controls the shearing rate which varies from 0 to 1000 $s^{-1}$ and is constant over the whole filtration surface for an ambient temperature range of up to 100° C. The differential pressure between the top and the bottom of the cell is controlled by excess pressure of nitrogen applied to the mud.

The dynamic filtration device has the advantage of being very flexible with respect to the filtering medium to be used. In the case of filtration on a porous medium, any core taken from the rock over a diameter of 33 mm and a length of 70 mm is suitable, it is placed under conditions of saturation that cannot be reduced in water. The filtering medium is used in order to generate longitudinal draining: under the effect of crimping pressure, the membrane adheres to the walls of the filtering medium and limits radial diffusion problems.

The evolution of the test is managed manually thanks to the presence of manometers used to control pressure levels. A differential pressure is applied between the top and the bottom of the cell; this operation initializes the dynamic filtration test. The data (volume filtered over time) is then processed instantly by a computer and the fluid's filtration behavior can then be monitored in real time.

Dynamic filtration tests are carried out on a core in order to evaluate the impact of the treatment product on permeability during invasion and during production. A standard procedure is followed:

- initial saturation of the cell (100% brine or residual saturation in water and determination of permeability to brine or oil);
- invasion by drilling fluid under dynamic conditions;
- introduction of the treatment product under a controlled pressure difference;
- measurement of the external cake detachment pressure remaining after the treatment product is applied and measurement of the return to oil permeability.

The dynamic filtration test is carried out on a Berea sandstone core.

The sample is measured exactly (length, cross section, dry weight), then saturated under vacuum with brine NaCl 40 g/l and KCl 5 g/l. The difference between the dry weight and the brine saturated weight can be used to calculate the volume of the pores ($V_P$) and the porosity ($\Phi$).

The sample is then placed in a vertical Hassler cell and swept with brine under a pore pressure of 10 bars in order to eliminate any trace of gas in the porous medium. The permeability of the sandstone rock is in the region of 0.6 Darcy.

In order to measure the permeability to brine ($K_W$), it is sufficient to observe the pressure profiles at different rates and apply Darcy's law: $dV/dt = K \cdot (\Delta P \cdot A)/(\eta \cdot L)$, where dV/dt=rate
K=permeability
ΔP=pressure
A=surface area
η=viscosity
L=length.

The saturation that cannot be reduced in water is achieved by injecting Soltrol 130® (mineral oil) at different rates. The volume of brine displaced is recovered in a graduated burette. The volume of oil injected corresponds to 20 volumes of pores. The saturation that cannot be reduced in water is achieved in the porous medium when the displaced water volume is nil.

To measure oil permeability ($K_O$) after irreducible saturation, the procedure is identical to the measurement of $K_W$.

Results: It is observed that the demulsifying formulation tested is effective in terms of destructuring external cakes. However, the determining factor on implementation in the field is whether, on average, it improves the drainage properties of the area next to the drain walls.

The variation in the filtered volume over time occurs at two speeds successively. Initially, the destructuring of the external cake results in a relatively low filtered flow rate, then the invasion of the formation by the cleaning solution results in a constantly increasing flow rate.

In this case, the initial oil permeability is approximately 567 mD, and the brine permeability is 462 mD. The contact time with the treatment product is 1 hour; the overpressure is 10 bars. The return permeability after contact with the treatment product is 270 mD, i.e. approximately 50% of the initial oil permeability. Comparatively, without treatment, the return permeability is in the region of 25% of the initial oil permeability.

Furthermore, in accordance with the compatibility studies, no additional damage is observed as might be the case for a water-based treatment fluid. In fact, under the same conditions, a water-based treatment results in a return permeability of 17% of the initial oil permeability.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications cited above and below, and of corresponding French application 00/11842, filed Sep. 15, 2000, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An oil-based demulsifying formulation capable of breaking a water-in-oil emulsion and comprising at least one wetting agent, at least one demulsifier and at least one solvent, the whole being a mixture in an organic base comprising a mixture of methyl esters of rapeseed oil, said wetting agent and demulsifier, being different from one another, and said solvent and organic base being optionally different from one another.

2. A process for drilling a well, comprising drilling with an oil-based drilling mud, and treating a drain drilled in the oil-based mud with a demulsifying formulation, the improvement wherein the demulsifying agent is an oil-based demulsifying formulation capable of breaking a water-in-oil emulsion and comprising at least one wetting agent, at least one demulsifier and at least one solvent, the whole being a mixture in an organic base, said wetting agent and demulsifier being different from one another, and said solvent and base being optionally different from one another.

3. In the treatment of a drain drilled in oil-based mud with a demulsifying formulation, the improvement wherein the demulsifying agent is an oil-based demulsifying formulation capable of breaking a water-in-oil emulsion and comprising at least one wetting agent, at least one demulsifier and at least one solvent, the whole being a mixture in an organic base, said wetting agent and demulsifier being different from one another, and said solvent and base being optionally different from one another.

4. An oil-based demulsifying formulation according to claim 1, wherein said wetting agent comprises an anionic surfactant.

5. A process according to claim 2, wherein said wetting agent comprises a sodium dialkyl sulfosuccinate.

6. A formulation according to claim 1, wherein said wetting agent comprises a sodium dialkyl sulfosuccinate.

7. A formulation according to claim 1, wherein said demulsifier comprises a non ionic or cationic surfactant selected from the group consisting of copolymers of ethylene oxide and propylene oxide, derivatives of alcohols or of phenols with alkoxylated or polyalkoxylated chain formations, polyalkyleneglycols, polyamines, alkoxylated or polyalkoxylated derivatives of amines, quaternary ammonium salts, quaternized alkanolamine esters, alkyl esters of fatty acids or natural oils, possibly alkoxylated or polyalkoxylated, and silicated derivatives.

8. A process according to claim 2, wherein said demulsifier comprises a non ionic or cationic surfactant selected from the group consisting of copolymers of ethylene oxide and propylene oxide, derivatives of alcohols or of phenols with alkoxylated or polyalkoxylated chain formations, polyalkyleneglycols, polyamines, alkoxylated or polyalkoxylated derivatives of amines, quaternary ammonium salts, quaternized alkanolamine esters, alkyl esters of fatty acids or natural oils, possibly alkoxylated or polyalkoxylated, and silicated derivatives.

9. A formulation according to claim 1, wherein said solvent is selected from the group consisting of the petroleum fractions, alcohols and hydro-alcoholic mixtures.

10. A formulation according to claim 7, wherein said solvent is selected from the group consisting of the petroleum fractions, alcohols and hydro-alcoholic mixtures.

11. A process according to claim 2, wherein said solvent is selected from the group consisting of the petroleum fractions, alcohols and hydro-alcoholic mixtures.

12. A process according to claim 2, wherein said organic base is a mineral oil or an oil of vegetable origin.

13. A process according to claim 2, wherein said organic base comprises a mixture of methyl esters of rapeseed oil.

14. In the treatment according to claim 3 wherein the oil of said formulation is the same as the oil in the mud.

15. In the treatment of a drain drilled in oil-based mud with a demulsifying formulation, the improvement wherein the demulsifying formulation is in accordance with claim 1.

16. In the treatment according to claim 15, wherein the base of said formulation is a mineral oil which is the same as the oil in the mud.

17. In the treatment of a drain drilled in oil-based mud with a demulsifying formulation, the improvement wherein the demulsifying formulation is in accordance with claim 7.

18. A formulation according to claim 1, wherein the wetting agent comprises an anionic surfactant and the demulsifier comprises a non-ionic or cationic surfactant.

19. A formulation according to claim 7, wherein the wetting agent is an anionic surfactant.

20. A process according to claim 2, wherein the solvent is hydro-alcoholic in nature and the organic base is hydrocarbon in nature.

21. A formulation according to claim 1, wherein the solvent and base are different from one another.

22. A process according to claim 2, wherein the solvent and base are different from one another.

23. In the treatment according to claim 3, wherein the solvent and base are different from one another.

24. An oil-based demulsifying formulation according to claim 1, wherein said formulation contains 0.005 to 20 g of pure surfactants per 100 ml of said organic base.

25. An oil-based demulsifying formulation according to claim 24, wherein said wetting agent is present in a proportion of 15 to 50% by weight of pure surfactant.

26. An oil-based demulsifying formulation according to claim 24, wherein said demulsifying agent is present in a proportion of 0.5 to 20% by weight of pure surfactant.

27. An oil-based demulsifying formulation according to claim 24, wherein said solvent is present in a proportion of 40 to 85% by weight.

28. An oil-based demulsifying formulation according to claim 24, wherein said formulation contains 0.01 to 10 g of pure surfactants per 100 ml of said organic base.

29. A process according to claim 2, wherein said wetting agent comprises a sodium dioctyl sulfosuccinate.

30. A formulation according to claim 6, wherein said wetting agent comprises a sodium dioctyl sulfosuccinate.

31. A process according to claim 2, wherein said formulation contains 0.005 to 20 g of pure surfactants per 100 ml of said organic base.

32. A process according to claim 31, wherein said wetting agent is present in a proportion of 15 to 50% by weight of pure surfactant.

33. A process according to claim 31, wherein said demulsifying agent is present in a proportion of 0.5 to 20% by weight of pure surfactant.

34. A process according to claim 31, wherein said solvent is present in a proportion of 40 to 85% by weight.

35. A process according to claim 31, wherein said formulation contains 0.01 to 10 g of pure surfactants per 100 ml of said organic base.

36. An oil-based demulsifying formulation capable of breaking a water-in-oil emulsion and consisting essentially of at least one wetting agent, at least one demulsifier and at least one solvent, the whole being a mixture in an organic base comprising a mixture of methyl esters of rapeseed oil, said wetting agent and demulsifier, being different from one another, and said solvent and organic base being optionally different from one another.

37. An oil-based demulsifying formulation capable of breaking a water-in-oil emulsion and consisting of at least one wetting agent, at least one demulsifier and at least one solvent, the whole being a mixture in an organic base comprising a mixture of methyl esters of rapeseed oil, said wetting agent and demulsifier, being different from one another, and said solvent and organic base being optionally different from one another.

* * * * *

UNITED STATES PATENT AND TRADEMARK OFFICE
CERTIFICATE OF CORRECTION

PATENT NO.       : 7,160,843 B2                                    Page 1 of 1
APPLICATION NO.  : 09/953209
DATED            : January 9, 2007
INVENTOR(S)      : Claire Giard-Blanchard It is certified that error appears in the above-identified patent and that said Letters Patent is hereby corrected as shown below:

Column 9, line 39 reads "demulsifier," should read -- demulsifier --
Column 12, line 9 reads "demulsifier," should read -- demulsifier --
Column 12, line 18 reads "demulsifier," should read -- demulsifier --

Signed and Sealed this

Twenty-seventh Day of November, 2007

JON W. DUDAS
*Director of the United States Patent and Trademark Office*